United States Patent [19]
Kujawa et al.

[11] 3,888,702
[45] June 10, 1975

[54] HYDROGEN PEROXIDE TREATMENT OF NICKEL SURFACES FOR SILICONE RUBBER BONDING

[75] Inventors: Richard J. Kujawa, Kokomo; Rebecca A. Swails, Greentown, both of Ind.

[73] Assignee: General Motors Corporation, Detroit, Mich.

[22] Filed: Nov. 19, 1973

[21] Appl. No.: 417,423

[52] U.S. Cl. ............................. 148/6.14 R; 117/49
[51] Int. Cl. ................................................ C23f 5/02
[58] Field of Search ........ 148/6.14 R; 117/49, 135.1

[56] References Cited
UNITED STATES PATENTS

| | | | |
|---|---|---|---|
| 2,819,192 | 1/1958 | Young | 148/6.14 R |
| 2,890,974 | 6/1959 | Carrigan | 148/6.14 R |
| 3,415,692 | 12/1968 | Armentano | 148/6.14 R |

Primary Examiner—Cameron K. Weiffenbach
Assistant Examiner—Charles R. Wolfe, Jr.
Attorney, Agent, or Firm—Robert J. Wallace

[57] ABSTRACT

An improved hydrogen peroxide treatment of nickel surfaces for enhancing silicone rubber adhesion is described. Lower concentration aqueous hydrogen peroxide solutions are used at room temperature, to provide a plurality of benefits. The solutions are catalyzed into reaction by selected additions of lead ion.

1 Claim, No Drawings

HYDROGEN PEROXIDE TREATMENT OF NICKEL SURFACES FOR SILICONE RUBBER BONDING

BACKGROUND OF THE INVENTION

This invention relates to a method for enhancing adhesion of silicone rubber, an organopolysiloxane resin, to nickel surfaces. More particularly, it involves an improved hydrogen peroxide treatment for promoting such adhesion.

One specific instance where it is important to get very good adhesion between nickel and silicone rubber is in the sealing of semiconductor devices. Semiconductor devices frequently are made by mounting a semiconductor device chip on a nickel surface, or between two nickel surfaces. Many such devices are sealed from the ambient, including any rigid encapsulation plastics, with a covering of silicone rubber. The silicone rubber covering is applied to the exposed part of the semiconductor chip and the contiguous portions of the nickel surface. If the rubber bonds well to the surrounding nickel surface, the semiconductor chip is effectively isolated from the ambient. The semiconductor device, for example, can be a silicone diode chip having a PN junction separating its opposite major faces. One face of the semiconductor chip is soldered to a surface of a nickel plated body to form an assembly. A contact is soldered to the other chip face, and the chip and nickel surface covered with silicone rubber. A rigid plastic may then be molded over the silicone rubber and a portion of the body. The chip can be soldered between two such bodies, the silicone rubber applied around the chip edge between the bodies, and a rigid plastic molded around the bodies over the silicone rubber.

It is normal practice to pretreat the assembly before the silicone rubber is applied, to insure good adhesion between the silicone rubber and the nickel. Typically, the assembly is pretreated with a hot aqueous solution consisting essentially of 30%, by weight, hydrogen peroxide. We have noted that in producing an adhesion enhancing effect, the hydrogen peroxide decomposes. However, the specific reaction with nickel that takes place, and the specific change produced on the nickel surface has not been identified. Nonetheless, a satisfactory hydrogen peroxide treatment does in fact enhance adhesion.

On the other hand, all grades of aqueous 30%, by weight, hydrogen peroxide solutions from all commercial sources could not be used in the prior process. Some solutions reacted violently, and even spontaneously decomposed when the semiconductor assemblies were immersed in it. This produced little or no adhesion enhancement. Other solutions reacted more moderately but not consistently when semiconductor assemblies were immersed in it. Still other solutions did not react at all when the semiconductor assemblies were immersed in it. As a result, one was quite limited in the grade and source of aqueous hydrogen peroxide solutions that could be used. Moreover, the particular grade and source that could be used had to be established through extensive trial and error. However, even then the hydrogen peroxide treatment had to be at a temperature in excess of 100° C., reaction rates were not consistent, and results on adhesion were correspondingly varied. Rapid or spontaneous decomposition of the peroxide still occasionally occurred, requiring careful observance of precautions during treatment.

We have found that the reaction of aqueous hydrogen peroxide solutions with such semiconductor assemblies is extremely sensitive to even trace amounts of other substances in the solution, including normal additives such as stabilizers, the most common of which is phosphate ion. We have also found that this sensitivity is aggravated by higher hydrogen peroxide concentrations and higher temperatures.

We have found that lower concentration aqueous hydrogen peroxide solutions can be successfully used if appropriately catalyzed, that they can be used at room temperature, and that such low temperature use of the lower concentration solutions reduces the sensitivities referred to. As a result, more sources and grades of aqueous hydrogen peroxide solutions can be used and the trial and error in selecting sources and grades is significantly reduced. Moreover, of those solutions useful, we have found how to get more consistent reactions and results. We have, therefore, found a much more controllable process, such as would be desirable for commercial production operations.

OBJECTS AND SUMMARY OF THE INVENTION

It is, therefore, an object of this invention to provide an improved highly controllable aqueous hydrogen peroxide heat treatment of nickel surfaces as a preparation for bonding silicone rubber to such surfaces.

It is also an object of this invention to provide an improved sealing process for semiconductor bodies on or between nickel surfaces.

These and other objects, features and advantages of this invention are obtained by immersing a body having a nickel surface in a substantially lead-free aqueous solution containing about 10% – 20% by weight hydrogen peroxide. About 0.5 – 20 parts per million lead ions are then introduced into the aqueous solution to initiate a predetermined decomposition of hydrogen peroxide and an attendant reaction with the nickel surface. The decomposition is allowed to proceed until substantially all of the hydrogen peroxide has decomposed. The nickel surface is then rinsed and dried. Silicone rubber can then be applied to the nickel surface and bonded in the normal and accepted manner.

DESCRIPTION OF THE PREFERRED EMBODIMENTS

In one specific example of our invention, an electrolytically plated copper body is immersed in a room temperature solution consisting essentially of water and 15% by weight hydrogen peroxide. The body could be electrolessly plated, or be wholly of nickel. A weighed piece of lead is then dropped into the solution and allowed to react with the hydrogen peroxide to produce a lead ion concentration of about 10 parts lead ion per one million parts solution. Bubbles will immediately form around the lead after it is dropped into the solution, and the bubbles will progressively disperse throughout the solution. This is followed by evolution of a dense white vapor for a few minutes and then a general clearing of the solution. The nickel plated body is then removed from the solution, rinsed in deionized water, rinsed in acetone, and dried under a heat lamp.

Silicone rubber can then be applied to the nickel surface and cured in the normal and accepted manner. By silicone rubber, we mean an organopolysiloxane resin.

One such resin is disclosed in U.S. Pat. No. 2,843,555. For semiconductor devices, a special grade of silicone rubber normally is used, as for example SILASTIC S-2007 and S-2374, obtainable from Dow Corning Corporation. The silicone rubber can be applied by spraying, dabbing, molding, or the like. The particular method by which the silicone rubber is applied and cured will vary, of course, depending upon the type of silicone rubber used and the instructions of the commercial source.

The hydrogen peroxide solutions useful in our method consist essentially of water and hydrogen peroxide, with traces of impurities depending on its grade and source. However, it should be substantially lead free, as will subsequently be explained. The concentration of hydrogen peroxide used in our method may vary from approximately 10% – 20%, by weight. If a lesser hydrogen peroxide concentration is used, reaction time is unduly long. If a greater hydrogen peroxide concentration is used, the solution can become too sensitive to contaminants and other variables, making it less controllable. For example, with aqueous hydrogen peroxide solutions within this range, up to 15 parts per million phosphate ion, a principal hydrogen peroxide stabilizer can be tolerated. This allows more consistency and reproducibility in the reactions and results. Also, more sources and grades of hydrogen peroxide can be used.

Since the hydrogen peroxide is preferably used in our process at room temperature, no external heating or cooling is required. By room temperature we mean temperatures of about 20° – 30° C., as compared to 100° C. On the other hand, it should be recognized that the reaction involved is exothermic. While the solution starts out at room temperature, it increases in temperature as the reaction proceeds. By way of example, the solution will self-heat to about 50° C. and begin to evolve a dense white vapor. It may continue to increase in temperature up to about 80° C. by the time evolution of the vapor subsides and the solution clears.

At least about 0.5 parts per million lead ion is required in the solution to initiate a reasonable reaction rate. If more than 20 parts per million lead ion are introduced into the solution, hydrogen peroxide decomposition can become unduly rapid and even spontaneous. As previously indicated, extremely rapid or spontaneous decomposition of the hydrogen peroxide does not produce enhanced adhesion on the nickel surfaces. Because of the foregoing, we prefer that the hydrogen peroxide solution contain no lead at all, although trace amounts can no doubt be tolerated to some extent. Such solutions are considered lead free.

We are uncertain as to the precise mechanism by which the lead addition produces its effect. It may be that the lead ion addition is merely an extremely controllable way of raising solution pH, to induce a very controllable moderate hydrogen peroxide decomposition. In any event, the lead ion can be introduced in a plurality of ways to catalyze the reaction. As indicated in connection with the specific example of this invention it can be introduced as pure lead metal. A piece of pure lead of the correct weight to produce the desired lead ion concentration need merely be dropped into the solution, where it will react with the hydrogen peroxide. In the alternative, one end of a lead bar can be dipped into the solution to catalyze the reaction. When the bar end is immersed, rapid bubbling will occur on it. Lead oxide, an orange deposit, will soon form that in turn produces more rapid bubbling. As this bubbling continues, an orange film will spread on the surface of the hydrogen peroxide solution that initiates still further bubbling across the entire surface of the solution. When this occurs, the lead bar should be removed, and the decomposition will continue at a moderate rate to completion. The lead can be introduced as pure lead or as an alloy, and it need not be introduced separately from the nickel body treated. By lead alloy, we mean a combination of metals containing more than 50% by weight lead. For example, in a semiconductor device assembly a small overflow of solder is usually present on the nickel surface around a semiconductor chip soldered to that surface. One such solder that might be used contains, by weight, 92.5% lead, 5% indium, and 2.5% silver. Some of the lead in the solder overflow will react with the hydrogen peroxide solution. By adding a large enough number of such assemblies to a given quantity of solution, enough lead ion can be introduced into the solution to eliminate the need for any separate lead ion addition at all. In fact, in some instances, where considerable excess lead is exposed on a type of part, the number of such parts per unit volume of solution may have to be limited, or the reaction can be too violent and even cause spontaneous decomposition of hydrogen peroxide. Consequently, in treating parts such as semiconductor assemblies where solder is exposed, the exposed solder can be used as a substitute for, or as a complement to, discrete lead addition. It should also be recognized that the lead ion can be introduced in the form of soluble salts.

We claim:

1. A highly controllabel method for treating nickel surfaces before bonding silicone rubber thereto, that consistently and reliably enhances adhesion of the silicone rubber to the nickel surfaces, which method includes use of a room temperature, low concentration aqueous hydrogen peroxide solution that is insensitive to phosphate ion contamination up to 15 parts per million, said method comprising the steps of immersing said nickel surface in a substantially lead-free and generally room temperature solution consisting essentially of water and about 10% – 20 % by weight hydrogen peroxide, introducing into said aqueous solution at least one metal selected from the group consisting of pure lead and lead alloys in an amount sufficient to produce 0.5 – 20 parts lead ion per million parts solution to initiate a moderate decomposition of said hydrogen peroxide and an attendant moderate reaction with the nickel surface on said bodies, allowing said decomposition and reaction to proceed until substantially all of the hydrogen peroxide has decomposed, rinsing said nickel surfaces, and drying them.

* * * * *